(12) United States Patent
Mori (10) Patent No.: US 8,655,216 B2
(45) Date of Patent: Feb. 18, 2014

(54) SWITCHING POWER SUPPLY DEVICE AND IMAGE FORMING APPARATUS INCLUDING SWITCHING POWER SUPPLY DEVICE

(75) Inventor: Atsunobu Mori, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/298,113

(22) Filed: Nov. 16, 2011

(65) Prior Publication Data

US 2012/0134706 A1 May 31, 2012

(30) Foreign Application Priority Data

Nov. 30, 2010 (JP) ................................. 2010-267295

(51) Int. Cl.
*G03G 15/00* (2006.01)

(52) U.S. Cl.
USPC .......................................... 399/88; 363/21.15

(58) Field of Classification Search
CPC ...................................................... G03G 15/00
USPC .......................................... 399/88; 363/21.15
See application file for complete search history.

(56) References Cited

U.S. PATENT DOCUMENTS

| | | | | |
|---|---|---|---|---|
| 6,597,159 B2 * | 7/2003 | Yang | ............................... | 323/283 |
| 7,040,727 B2 * | 5/2006 | Ryu et al. | ............................ | 347/5 |
| 7,746,677 B2 * | 6/2010 | Unkrich | ......................... | 363/125 |
| 7,826,239 B2 * | 11/2010 | Tepsumran et al. | ........ | 363/56.09 |
| 2004/0027400 A1 * | 2/2004 | Ryu et al. | ............................ | 347/5 |
| 2010/0195352 A1 * | 8/2010 | Murofushi | ....................... | 363/20 |
| 2013/0108303 A1 * | 5/2013 | Samejima et al. | .............. | 399/88 |

FOREIGN PATENT DOCUMENTS

| | | |
|---|---|---|
| CN | 1473387 A | 2/2004 |
| CN | 101083433 A | 12/2007 |
| CN | 101114792 A | 1/2008 |
| JP | 2003-333841 | * 11/2003 |
| JP | 2003-333841 A | 11/2003 |

* cited by examiner

*Primary Examiner* — Clayton E LaBalle
*Assistant Examiner* — Kevin Butler
(74) *Attorney, Agent, or Firm* — Canon USA Inc. IP Division (57) ABSTRACT

A switching power supply device including: a transformer configured to include a primary winding, a secondary winding, and an auxiliary winding; a switching unit configured to switch a current that flows through the primary winding of the transformer; a control unit configured to control a switching operation of the switching unit; a starting resistor connected between a voltage input side of the primary winding and a power supply terminal of the control unit; a voltage supply unit configured to rectify and smooth a voltage output from the auxiliary winding and supply the resultant to the power supply terminal; and an activation control unit configured to control activation timing of the control unit by inputting a voltage to an ON/OFF terminal of the control unit, the activation control unit being connected between the voltage input side of the primary winding and a ground side of the auxiliary winding.

8 Claims, 10 Drawing Sheets

SWITCHING POWER SUPPLY DEVICE AND IMAGE FORMING APPARATUS INCLUDING SWITCHING POWER SUPPLY DEVICE

CROSS REFERENCE TO RELATED APPLICATIONS

This application claims priority from Japanese Patent Application No. 2010-267295 filed Nov. 30, 2010, which is hereby incorporated by reference herein in its entirety.

BACKGROUND OF THE INVENTION

1. Field of the Invention

The present invention relates to a switching power supply device that inputs an alternating-current (AC) voltage from a commercial AC power source and generates a direct-current (DC) voltage.

2. Description of the Related Art

Figure 7:
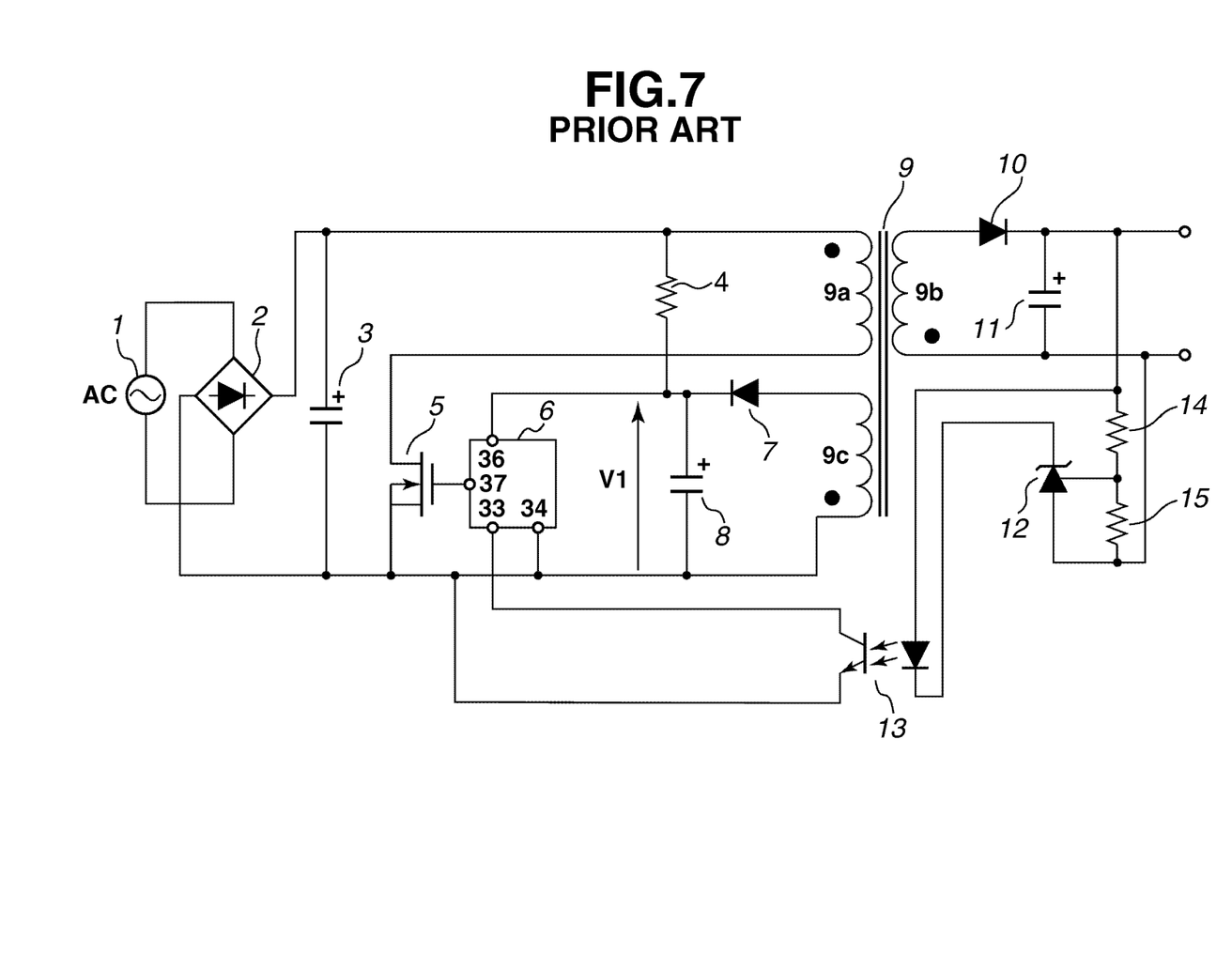
FIG. 7 is a circuit diagram of a conventional switching power supply device.

Conventionally, switching power supply devices have been known which supply voltage to control units such as a central processing unit (CPU) and drive units such as a motor in various types of electronic apparatuses. FIG. 7 illustrates the circuit configuration of a conventional switching power supply device. The switching power supply device includes a transformer 9 and a primary-side rectifying circuit. The transformer 9 includes a primary winding 9a, a secondary winding 9b, and an auxiliary winding 9c. The primary-side rectifying circuit includes a bridge rectifying circuit 2 and a smoothing capacitor 3, which rectify an AC voltage from a commercial AC power source 1 and supply the resulting DC voltage to the primary winding 9a of the transformer 9. The switching power supply device also includes a switching element 5 (in FIG. 7, a metal oxide semiconductor field-effect transistor (MOSFET) is used as an example) and an oscillation control circuit 6. The switching element 5 is connected in series to the primary winding 9c of the transformer 9. The oscillation control circuit 6 controls switching of the switching element 5. The switching power supply device also includes an auxiliary-side rectifying circuit and a starting resistor 4. The auxiliary-side rectifying circuit includes a rectifier diode 7 and a capacitor 8, which rectify the output of the auxiliary winding 9a of the transformer 9 and supply the resultant to a power supply terminal 36 of the oscillation control circuit 6. The starting resistor 4 is connected between the positive voltage output side of the primary-side rectifying circuit and the power supply terminal 36 of the oscillation control circuit 6.

A rectifier diode 10 and a capacitor 11 are connected to the secondary winding 9b of the transformer 9. The rectifier diode 10 and the capacitor 11 rectify the output from the secondary side of the transformer 9 to generate a DC voltage. Resistors 14 and 15, a shunt regulator 12, and a photocoupler 13 are connected to the secondary side of the transformer 9. The resistors 14 and 15 divide the output voltage. The shunt regulator 12 compares the voltage divided by the resistors 14 and 15 with an internal reference voltage, and amplifies the error for detection.

The output of the shunt regulator 12 is connected to the photocoupler 13 and transmitted to a feedback terminal 33 of the oscillation control circuit 6. The oscillation control circuit 6 performs pulse width modulation (PWM) control on the switching element 5 according to a current that flows through the phototransistor of the photocoupler 13. Such a circuit, constituting a feedback control loop, can control the output voltage of the secondary side to a target voltage.

Figure 8:
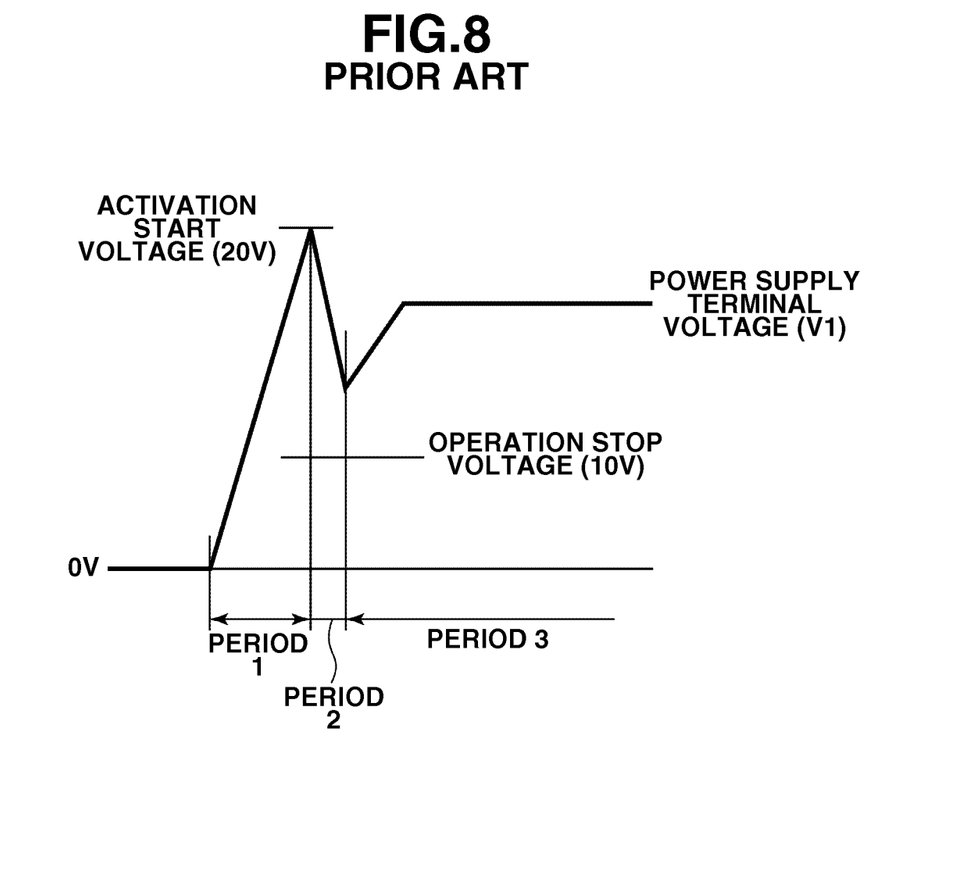
FIG. 8 is a chart illustrating the voltage waveform of a power supply terminal upon activation of the conventional switching power supply device.

Next, the activating operation of the switching power supply device illustrated in FIG. 7 will be described with reference to FIG. 8. An AC voltage is supplied from the commercial AC power source 1. The output from the rectifying circuit on the primary side of the transformer 9 initially charges the capacitor 8 through the starting resistor 4. Charging the capacitor 8 increases the voltage V1 that is supplied to the power supply terminal 36 of the oscillation control circuit 6. When the voltage V1 reaches an activation start voltage (here, set to 20 V) of the oscillation control circuit 6, the oscillation control circuit 6 operates to start the switching operation of the switching element 5 (period 1 in FIG. 8).

During the switching operation, the oscillation control circuit 6 consumes a current more than supplied from the starting resistor 4. This lowers the voltage V1 on the power supply terminal 36 (period 2 in FIG. 8). With the switching started, a voltage occurs in the auxiliary winding 9c of the transformer 9. The voltage is supplied to the power supply terminal 36 of the oscillation control circuit 6 through the auxiliary-side rectifying circuit, so that the voltage V1 rises in value again (period 3 in FIG. 8). After the oscillator control circuit 6 is powered by the starting resistor 4 for activation, the oscillator control circuit 6 is supplied with the voltage from the auxiliary-side rectifying circuit. It should be noted that the resistance of the starting resistor 4 and the capacitance of the capacitor 8 are set so that the voltage value of V1 remains at or above an operation stop voltage (here, set to 10 V) of the oscillation control circuit 6 in period 2 of FIG. 8. Japanese Patent Application Laid-Open No. 2003-333841 discusses a method of activating a power supply device using such a starting resistor 4.

Figure 9:
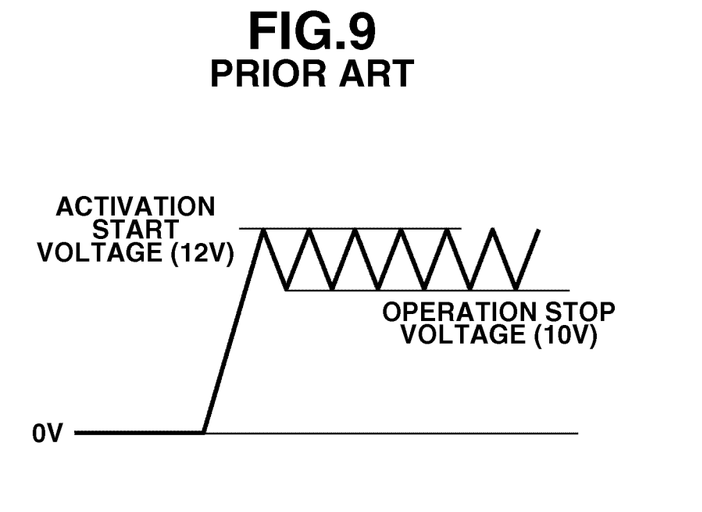
FIG. 9 is a chart illustrating an activation failure that occurs at the time of activation of the conventional switching power supply device.

The foregoing power supply device uses the starting resistor 4 to activate the oscillation control circuit 6. Such a power supply device may sometimes fail to properly activate the oscillation control circuit 6 if the oscillation control circuit 6 has a small hysteresis width between the activation start voltage and the operation stop voltage. To be more specific, suppose that the hysteresis width between the activation start voltage and the operation stop voltage is small as illustrated in FIG. 9. In such a case, even if the voltage V1 on the power supply terminal 36 of the oscillation control circuit 6 exceeds the activation start voltage to start a switching operation, a voltage drop after the activation brings down the voltage V1 to below the operation stop voltage to stop the switching operation. The power supply device subsequently repeats the cycle of activation and stop, resulting in being unable to activate.

To solve the problem of an activation failure due to such a small hysteresis width, measures such as increasing the capacitance of the smoothing capacitor 8 on the auxiliary side and reducing the resistance of the starting resistor 4 have been taken heretofore. However, the problems described below occur in such measure.

(1) Increasing the capacitance of the smoothing capacitor 8 increases the time for the voltage V1 on the power supply terminal 36 of the oscillation control circuit 6 to reach the activation start voltage, so that the time for the activation of the power supply device increases. In other word, it takes longer to activate the power supply device. Such a power supply device, if applied to an apparatus, may increase the waiting time for startup. (2) Reducing the resistance of the starting resistor 4 increases a power loss in the starting resistor 4, so that the power conversion efficiency of the power supply device decreases.

SUMMARY OF THE INVENTION

The present invention is directed to activating a switching power supply device in a short time with stability even if its control circuit for controlling a switching operation has a small hysteresis width between the activation start voltage and the operation stop voltage.

According to an aspect of the present invention, there is provided a switching power supply device including: a transformer configured to include a primary winding, a secondary winding, and an auxiliary winding; a switching unit configured to switch a current that flows through the primary winding of the transformer; a control unit configured to control a switching operation of the switching unit; a starting resistor connected between a voltage input side of the primary winding and a power supply terminal of the control unit; a voltage supply unit configured to rectify and smooth a voltage output from the auxiliary winding and supply the resultant to the power supply terminal; and an activation control unit configured to control activation timing of the control unit by inputting a voltage to an ON/OFF terminal of the control unit, the activation control unit being connected between the voltage input side of the primary winding and a ground side of the auxiliary winding.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The configuration and operation of exemplary embodiments of the present invention will be described below. It should be noted that the following exemplary embodiments are just a few examples, and not intended to limit the technical scope of the invention. Mode for carrying out the present invention will be described in detail below in conjunction with the exemplary embodiments with reference to the accompanying drawings.

Figure 1:
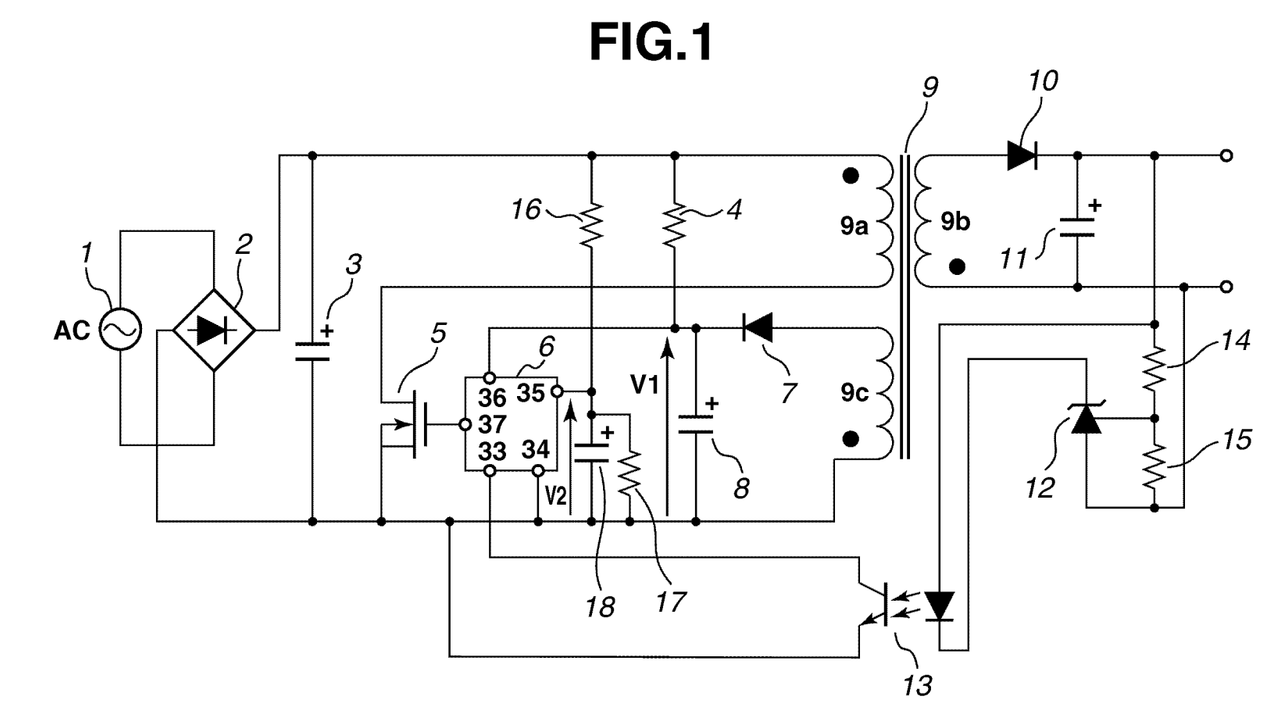
FIG. 1 is a circuit diagram of a power supply according to a first exemplary embodiment.
Figure 2:
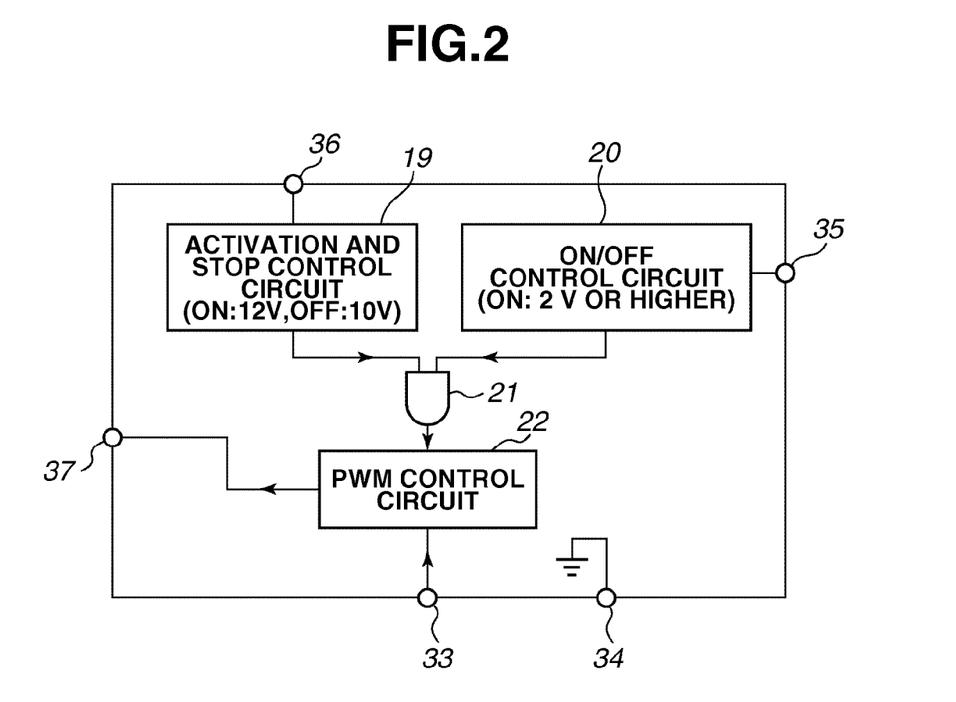
FIG. 2 is a block diagram of an oscillation control circuit according to the first exemplary embodiment.

Referring to FIGS. 1 and 2, a switching power supply device according to a first exemplary embodiment will be described. Parts similar or corresponding to those of the configuration described in FIG. 7 will be designated by the same reference numerals, and description thereof will be omitted. Differences from the configuration example of FIG. 7 will be described in detail below.

FIG. 2 is a block diagram illustrating the internal configuration of an oscillation control circuit 6 according to the first exemplary embodiment. The oscillation control circuit 6 of the switching power supply device is composed of a dedicated integrated circuit (IC). The oscillation control circuit 6 includes a PWM control circuit 22, an activation and stop control circuit 19, an ON/OFF control circuit 20, and an AND circuit 21. The activation and stop control circuit 19 is connected to a power supply terminal 36.

A feedback signal (signal from a photocoupler 13 to be described later) is input to the PWM control circuit 22 from the secondary side of a transformer 9 through a feedback terminal 33. Based on the feedback signal, the PWM control circuit 22 determines the ON duty of a drive signal to be supplied to a switching element 5. As employed herein, the ON duty refers to the time for which the switching element 5 is turned ON. In the present exemplary embodiment, a MOSFET is applied as the switching element 5. The PWM control circuit 22 is connected to an output terminal 37 of the oscillation control circuit 6. The output terminal 37 is connected to the gate terminal of the switching element 5.

The activation and stop control circuit 19, connected to the power supply terminal 36, controls the activation and stop of the switching power supply device. The IC used in the first exemplary embodiment has a hysteresis width, which is set between the activation start voltage and the operation stop voltage, smaller than in the conventional example of FIG. 8. Specifically, in the present exemplary embodiment, the activation and stop control circuit 19 turns ON the PWM control circuit 22 when a voltage V1 on the power supply terminal 36 exceeds an activation start voltage of 12 V upon activation of the switching power supply device. After the activation of the switching power supply, the activation and stop control circuit 19 turns OFF the PWM control circuit 22 when the voltage V1 on the power supply terminal 36 falls below an operation stop voltage of 10 V. In other words, the IC applied in the present example has a hysteresis width as small as 2 V while the hysteresis width in the conventional example of FIG. 8 is 10 V.

The ON/OFF control circuit 20 turns ON the PWM control circuit 22 when a voltage (referred to as V2) on an ON/OFF terminal 35 of the oscillation control circuit 6 is higher than or equal to 2 V. The AND circuit 21 ANDs the outputs of the ON/OFF control circuit 20 and the activation and stop control circuit 19, and inputs the result to the PWM control circuit 22. In other words, the PWM control circuit 22 is configured to operate when both the ON/OFF control circuit 20 and the activation and stop control circuit 19 are turned on. The terminal 34 is a ground terminal.

FIG. 1 is a circuit diagram of the switching power supply device according to the first exemplary embodiment. Similarly to FIG. 7, the switching power supply includes a transformer 9 which has a primary winding 9a, a secondary winding 9b, and an auxiliary winding 9c. As compared to the conventional example of FIG. 7, there are added resistors 16 and 17 and a capacitor 18. The resistors 16 and 17 divide the output voltage of a primary smoothing capacitor 3, and input the resultant to the ON/OFF terminal 35 of the oscillation control circuit 6. As illustrated in the diagram, the added circuit is connected between the voltage input side of the primary winding 9a of the transformer 9 and the ground side of the auxiliary winding 9c. The circuit characterizes the present exemplary embodiment, functioning as an activation control unit for controlling the activation timing of the oscillation control circuit 6.

Figure 3:
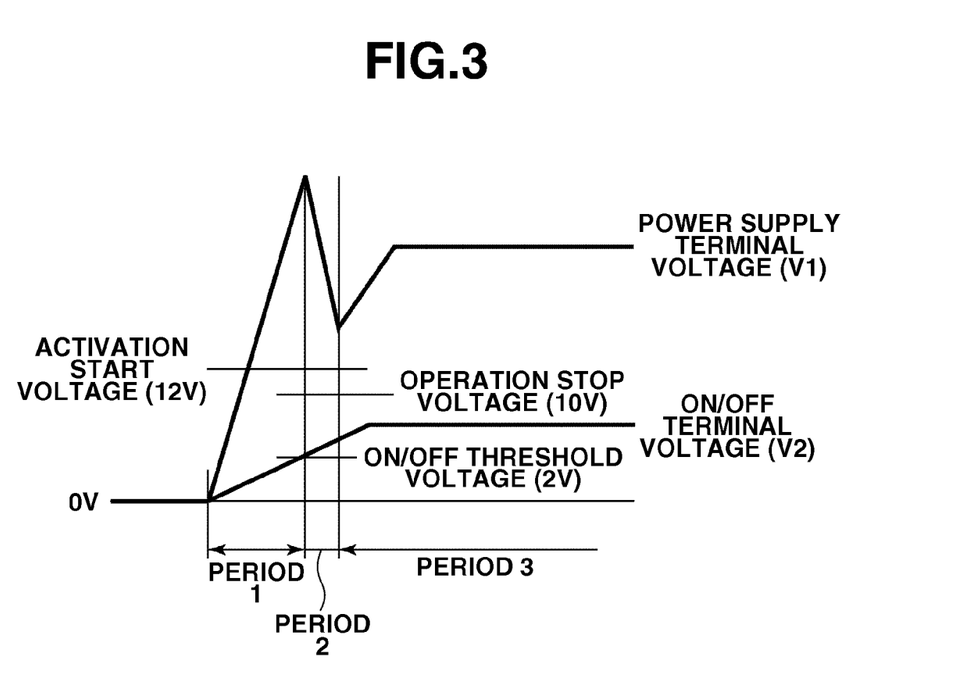
FIG. 3 is a chart illustrating the voltages of a power supply terminal and an ON/OFF terminal upon activation of the power supply device according to the first exemplary embodiment.

FIG. 3 is a chart illustrating the voltage waveforms of the power supply terminal 36 and the ON/OFF terminal 35 upon activation of the switching power supply device according to the first exemplary embodiment. An AC voltage is supplied from a commercial AC power source 1. The output of the primary-side rectifying circuit charges a capacitor 8 through a starting resistor 4. Charging the capacitor 8 increases the voltage V1 that is input to the power supply terminal 36 of the oscillation control circuit 6. In the circuit of the first exemplary embodiment, the capacitor 18 is also charged through the resistor 16 with the voltage V1, so that the voltage V2 input to the ON/OFF terminal 35 increases.

The voltage V1 input to the power supply terminal 36 reaches the activation start voltage (in the present exemplary embodiment, 12 V) of the oscillation control circuit 6 before the voltage V2 input to the ON/OFF terminal 35 reaches an ON/OFF threshold voltage of 2 V. The switching power supply device is thus not activated yet. When V2 exceeds the ON/OFF threshold voltage of 2 V, the oscillation control circuit 6 operates to start the switching operation of the switching element 5 (period 1 in FIG. 3). During the switching operation, the oscillation control circuit 6 consumes a current more than a current supplied from the starting resistor 4. This lowers the voltage V1 on the power supply terminal 36 (period 2 in FIG. 3). With the switching started, a voltage occurs in the auxiliary winding 9c of the transformer 9. The voltage is supplied to the power supply terminal 36 of the oscillation control circuit 6 through the auxiliary-side rectifying circuit, so that the voltage V1 rises in value again (period 3 in FIG. 3).

If the AC voltage from the commercial AC power source 1 is low in value, the voltage across the primary smoothing capacitor 3 decreases. The voltage V2 divided by the resistors 16 and 17 falls below the ON/OFF threshold voltage of 2 V. As a result, the oscillation control circuit 6 can be prevented from operation when the input AC voltage is low. This can prevent the switching element 5 from being driven, heated, and broken under low input voltage. In the first exemplary embodiment, the resistor 16 is set to 720 kΩ, and the resistor 17 to 36 kΩ. Such settings prevent the switching operation from being started until the voltage across the primary smoothing capacitor 3 reaches or exceeds 42 V.

As has been described above, according to the present exemplary embodiment, the switching operation is stopped even when the voltage V1 input to the power supply terminal 36 of the oscillation control circuit (IC) 6 is higher than the activation start voltage, unless the voltage V2 input to the ON/OFF terminal 35 exceeds the threshold voltage. In other words, the activation timing is controlled by the voltage V2 input to the ON/OFF terminal 35. The switching power supply device can thus be activated with stability even if the oscillation control circuit 6 used has a small hysteresis width between the activation start voltage and the operation stop voltage.

The circuit for stopping a switching operation at activation time includes the ON/OFF terminal 35 and the resistor 16, which are also used to constitute a circuit for stopping a switching operation when the voltage of the commercial AC power source 1 is low. This can prevent the breakdown of the switching element 5 with an inexpensive circuit configuration.

Next, a switching power supply device according to a second exemplary embodiment will be described. In the second exemplary embodiment, a constant voltage circuit is added so that the voltage of the power supply terminal 36 of the oscillation control circuit 6 will not reach or exceed a predetermined value upon activation of the switching power supply device. There is also added a circuit that discharges the voltage of the ON/OFF terminal 35 upon the activation of the switching power supply device. Essential parts of the second exemplary embodiment have the same circuit configuration as in the first exemplary embodiment. Description thereof will thus be omitted.

Figure 4:
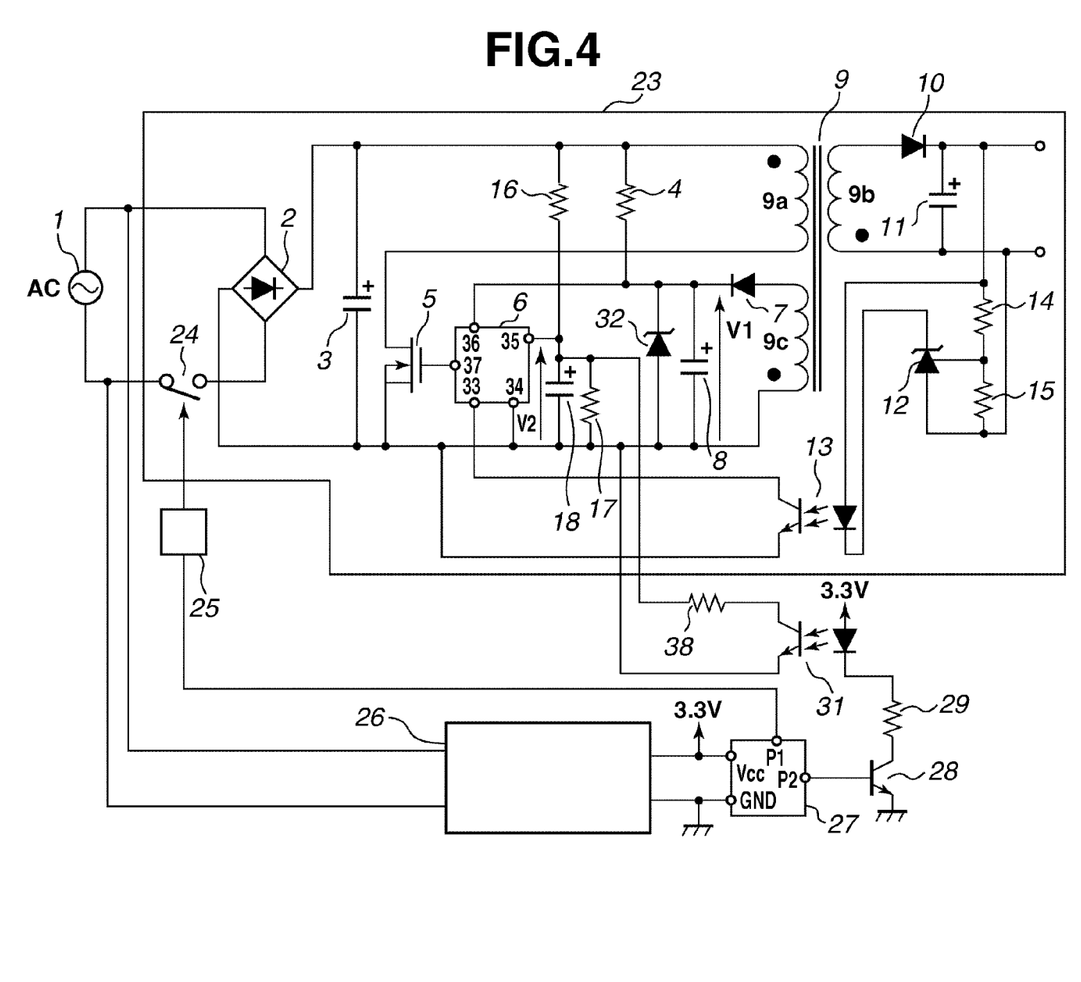
FIG. 4 is a circuit diagram of a power supply according to a second exemplary embodiment.
Figure 5:
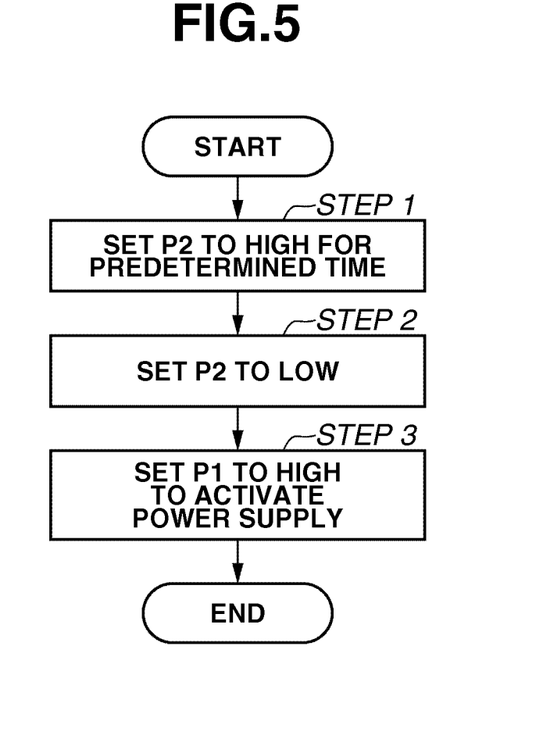
FIG. 5 is a flowchart according to the second exemplary embodiment.

FIG. 4 is a diagram illustrating the circuit configuration according to the second exemplary embodiment. A CPU 27 is arranged outside a switching power supply 23. The CPU 27 controls the voltage supply to and the operation of the switching power supply 23. A power supply circuit 26 supplies power to the CPU 27. A relay 24 turns ON/OFF the AC voltage that is supplied from a commercial AC power source 1 to the switching power supply 23. The relay 24 is turned ON/OFF through a relay drive circuit 25. Setting an input/output (I/O) port (hereinafter, referred to as P1) of the CPU 27 to a high level turns ON the relay 24. Setting the I/O port (P1) to a low level turns OFF the relay 24. A photocoupler 31 is connected to the ON/OFF terminal 35 of the oscillation control circuit 6 through a resistor 38. The secondary side of the photocoupler 31 is controlled by a control signal from the CPU 27. When an I/O port (hereinafter, referred to as P2) of the CPU 27 is at a high level, a transistor 28 turns ON to pass a current through the light-emitting diode of the photocoupler 31 through a resistor 29. As a result, the phototransistor of the photocoupler 31 turns ON, whereby the capacitor 18 can be discharged to approximately 0 V. FIG. 5 is a flowchart illustrating control when the CPU 27 activates the switching power supply 23. The CPU 27 starts control. In step 1, the CPU 27 sets P2 to a high level for a predetermined time, thereby discharging the voltage of the ON/OFF terminal 35. In step 2, the CPU 27 sets P2 to a low level. In step 3, the CPU 27 sets P1 to a high level, thereby turning ON the relay 24 to activate the switching power supply.

By such a control, even if the switching power supply 23 is turned OFF and ON in a short time, the switching power supply device can be prevented from being activated with a voltage left in the capacitor 18. This enables stable activation of the switching power supply device always in a state where the power supply terminal 36 is at a sufficiently high voltage.

Figure 6A:
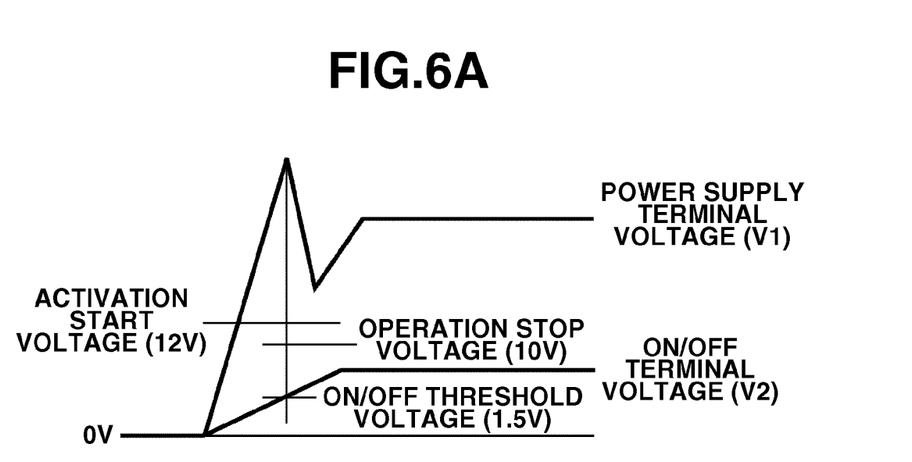
FIGS. 6A and 6B are charts illustrating the voltages of a power supply terminal and an ON/OFF terminal upon activation of the power supply according to the second exemplary embodiment.
Figure 6B:
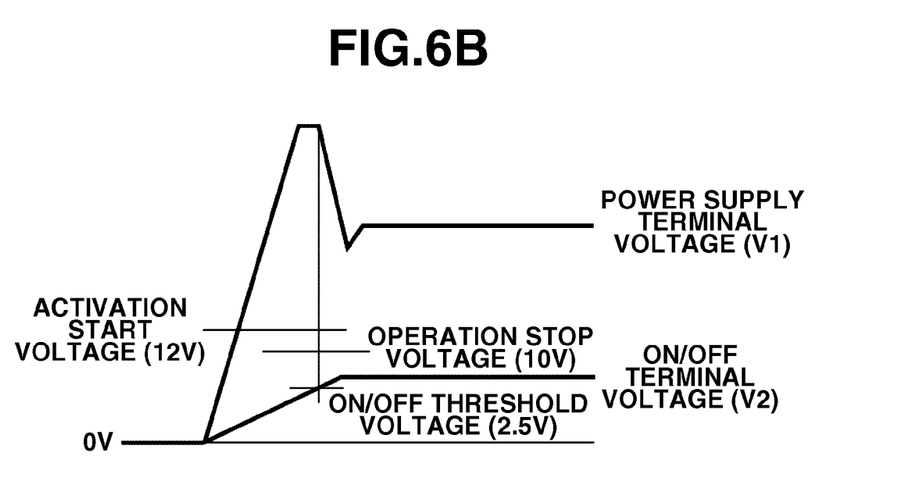

The second exemplary embodiment also includes a Zener diode 32 which is connected to the power supply terminal 36. FIGS. 6A and 6B are charts illustrating the voltage waveforms of the power supply terminal 36 and the ON/OFF terminal 35 upon activation of the switching power supply device according to the second exemplary embodiment. FIG. 6A illustrates a case where the ON/OFF threshold voltage is 1.5 V. FIG. 6B illustrates a case where the ON/OFF threshold voltage is 2.5 V. For example, assume that the starting resistor 4 is 70 kΩ, the capacitor 8 is 47 μF, the resistor 16 is 720 kΩ, the resistor 17 is 36 kΩ, the capacitor 18 is 47 μF, and the commercial AC power source 1 has an effective voltage of 100 V. Without the Zener diode 32, the voltage V1 shows the following values: At the ON/OFF threshold voltage of 1.5 V: V1=16.5 V, and At the ON/OFF threshold voltage of 1.2 V: V1=28.8 V. The Zener diode 32 employed here shall restrict the voltage V1 to 25 V. The ON/OFF threshold voltage may vary from one oscillation control circuit to another. Despite such variations, the application of the Zener diode 32 can prevent the voltage V1 on the power supply terminal 36 from exceeding a maximum rated voltage upon activation of the switching power supply device.

As has been described above, according to the present exemplary embodiment, the constant voltage circuit is added to the power supply terminal 36 of the oscillation control circuit 6. This can prevent the voltage V1 supplied to the power supply terminal 36 from reaching or exceeding the maximum rated voltage at the time of activation because of variations in the ON/OFF threshold voltage. The configuration to discharge the capacitor 18 attached to the ON/OFF terminal 35 upon activation of the switching power supply device can prevent an activation failure of the switching power supply device.

Examples of application of the switching power supply devices will be described. The current resonance type switching power supply devices described in the first and second exemplary embodiments may be applied to a low voltage power supply of an image forming apparatus such as a laser beam printer, copying machine, and facsimile. An example of application will be given below. A switching power supply device is applied to a power supply device for supplying power to a controller serving as a control unit of an image forming apparatus and to a motor serving as a drive unit of a conveyance roller which conveys a sheet.

Figure 10A:
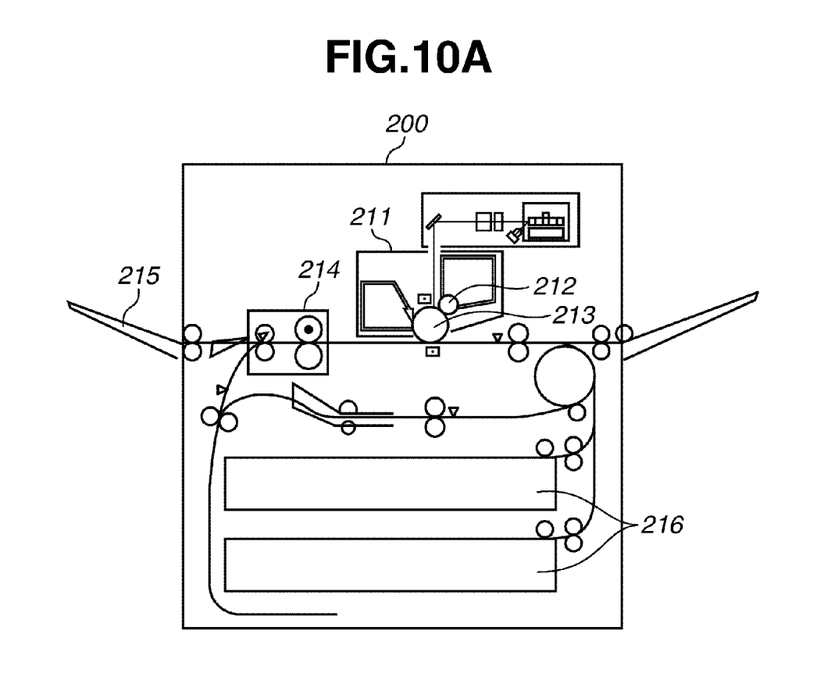
FIGS. 10A and 10B are diagrams illustrating an example of application of a power supply device.
Figure 10B:
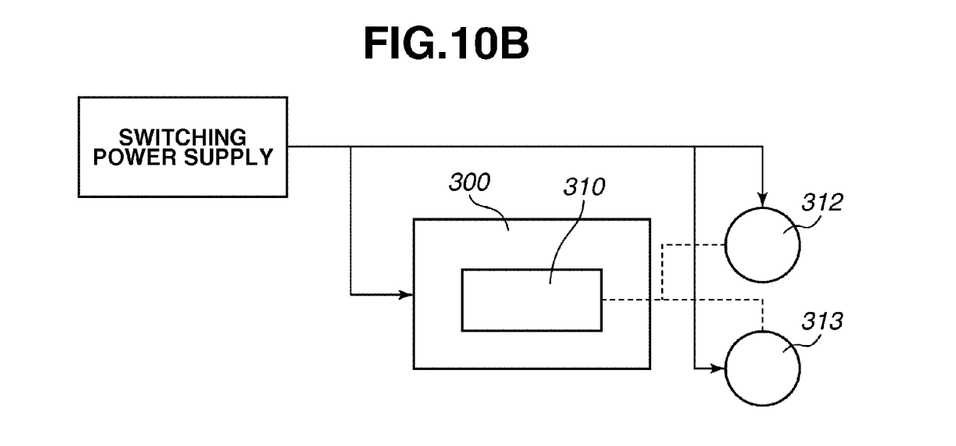

FIG. 10A illustrates the schematic configuration of a laser beam printer, an example of the image forming apparatus. The laser beam printer 200 includes an image forming unit 211. The image forming unit 211 includes a photosensitive drum 213 and a development unit 212. The photosensitive drum 213 is an image bearing member on which a latent image is formed. The development unit 212 develops the latent image formed on the photosensitive drum 212 with toner. The toner image developed on the photosensitive drum 213 is transferred to a sheet (not illustrated) which is a recording medium fed from a cassette 216. A fixing device 214 fixes the toner image transferred to the sheet, and discharges the sheet to a tray 215. FIG. 10B illustrates electric power supply lines from the switching power supply device to a controller 300 serving as control unit, and motors 312 and 313 serving as drive units, of the image forming apparatus 200. The current resonance type switching power supply devices described above may be applied to the low voltage power supply for supplying power to the controller 300 and the motors 312 and 313. The controller 300 includes a CPU 310 that controls the image forming operation. The motors 312 and 313 serve as drive units for image formation. The electrical power of 3.3V is supplied to the controller 300. The electrical power of 24V is supplied to the motors 312 and 313. An example of the motor 312 is a motor to drive a conveyance roller for conveying a sheet. An example of the motor 313 is a motor to drive the fixing device 214. In the case of application to an image forming apparatus such as a laser beam printer, the switching power supply may be composed of less expensive ICs or analog control circuits to reduce the total cost of the apparatus. The application of the foregoing current resonance type switching power supply devices enables the application of switching power supply devices that include inexpensive ICs or control circuits having a small hysteresis width. An activation failure of a power supply device can be avoided even if the input voltage from the commercial AC power source drops. The current resonance type power supply devices described in the first and second exemplary embodiments are not limited in application to the image forming apparatus discussed above, and may be applied to low voltage power supplies of other electronic apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-267295 filed Nov. 30, 2010, which is hereby incorporated by reference herein in its entirety.

What is claimed is:

1. A switching power supply device comprising:
a transformer configured to include a primary winding, a secondary winding, and an auxiliary winding;
a switching unit configured to switch a current that flows through the primary winding of the transformer;
a control unit configured to control a switching operation of the switching unit, the control unit including a power supply terminal to which a power-supply voltage is supplied and an ON/OFF terminal for activating the control unit;
a starting resistor connected between a voltage input side of the primary winding and the power supply terminal of the control unit;
a voltage supply unit configured to rectify and smooth a voltage output from the auxiliary winding and supply the rectified and smoothed voltage to the power supply terminal; and
a timing control unit configured supply a value according to a voltage to be input to the primary winding to the ON/OFF terminal of the control unit so as to control startup timing of the control unit.

2. The switching power supply device according to claim 1, further comprising a restriction unit configured to restrict a voltage that is input to the control unit through the starting resistor.

3. The switching power supply device according to claim 1, further comprising a discharge unit configured to discharge the voltage on the ON/OFF terminal of the control unit upon activation of the switching power supply device.

4. The switching power supply device according to claim 3, wherein the discharge unit discharges the voltage on the ON/OFF terminal of the control unit depending on a control signal from outside.

5. An image forming apparatus including an image forming unit configured to form an image on an image bearing member, the image forming apparatus comprising:
a control unit configured to control an image forming operation of the image forming unit; and
a switching power supply device configured to supply power to the control unit,
wherein the switching power supply device comprises:
a transformer configured to include a primary winding; a secondary winding, and an auxiliary winding,
a switching unit configured to switch a current that flows through the primary winding of the transformer;
a switching control unit configured to control a switching operation of the switching unit the control unit including a power supply terminal to which a power-supply voltage is supplied and an ON/OFF terminal for activating the control unit;
a starting resistor connected between a voltage input side of the primary winding and the power supply terminal of the control unit;
a voltage supply unit configured to rectify and smooth a voltage output from the auxiliary winding and supply the rectified and smoothed voltage to the power supply terminal; and a timing control unit configured to supply a value according to a voltage to be input to the primary winding to the ON/OFF terminal of the control unit so as to control startup timing of the control unit.

6. The image forming apparatus according to claim 5, further comprising a restriction unit configured to restrict a voltage that is input to the switching control unit through the starting resistor.

7. The image forming apparatus according to claim 5, further comprising a discharge unit configured to discharge the voltage on the ON/OFF terminal of the switching control unit upon activation of the switching power supply device.

8. The image forming according to claim 7, wherein the discharge unit discharges the voltage on the ON/OFF terminal of the switching control unit depending on a control signal from outside.

* * * * *